Oct. 31, 1961  D. A. AYLETT  3,007,153
RADAR DISPLAY APPARATUS
Filed Dec. 5, 1956  2 Sheets-Sheet 1
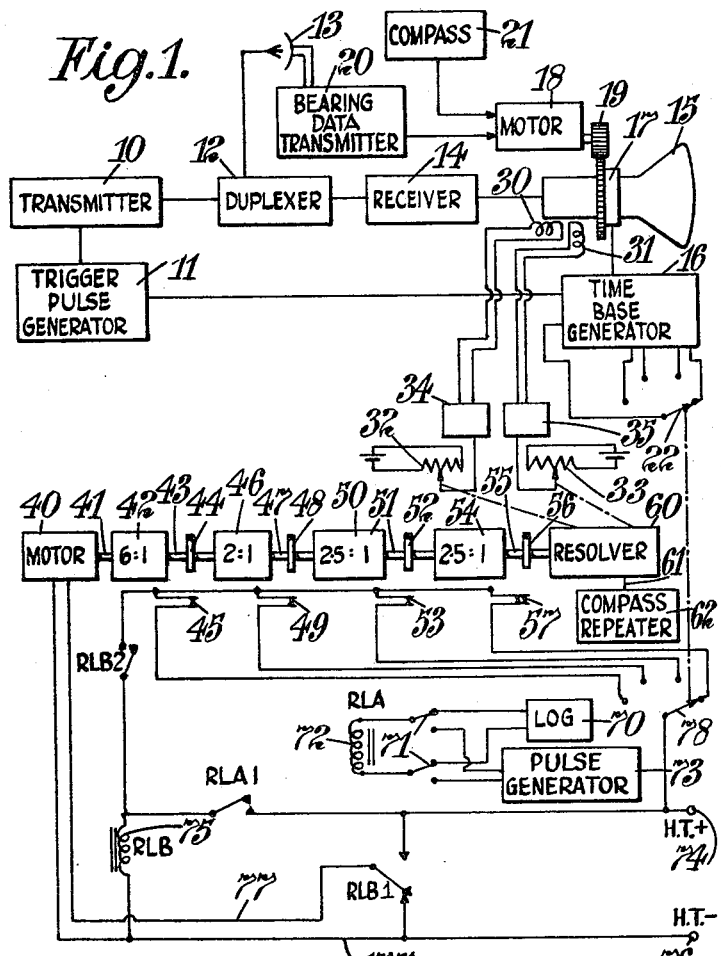
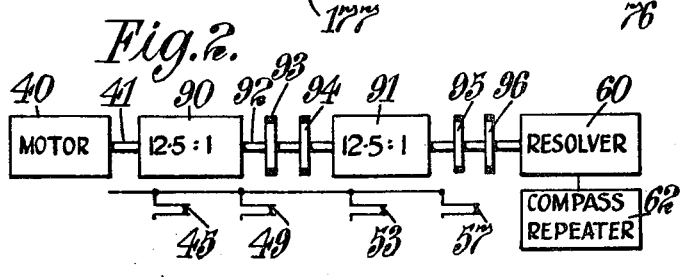
INVENTOR
D. A. AYLETT
By Mawhinney & Mawhinney
ATTYS.

Oct. 31, 1961 D. A. AYLETT 3,007,153
RADAR DISPLAY APPARATUS
Filed Dec. 5, 1956 2 Sheets-Sheet 2

INVENTOR
D. A. AYLETT
By Mawhinney & Mawhinney
ATT/S.

United States Patent Office 3,007,153
Patented Oct. 31, 1961

3,007,153
RADAR DISPLAY APPARATUS
Douglas Arthur Aylett, London, England, assignor to
The Decca Record Company Limited, London, England, a British company
Filed Dec. 5, 1956, Ser. No. 626,495
Claims priority, application Great Britain Dec. 6, 1955
11 Claims. (Cl. 343—5)

This invention relates to radar display apparatus for use on mobile craft in which a radar plan position display is continuously moved on the display screen in accordance with the movement of the craft. Such movement of the display on the screen (commonly referred to as stabilization of the display) ensures that echoes from fixed targets will remain in a constant position on the screen and thus can be more readily distinguished from echoes from moving targets.

It is often desirable in radar apparatus to make provision for enabling the scale of the display on the screen to be changed at will and the present invention is directed more particularly to the stabilization of the displays in radar apparatus providing displays of different scales.

According to this invention radar display apparatus for use on a mobile craft and having adjustable deflection control means in the deflection circuit for a plan position display to move the display on the display screen in accordance with the movement of the craft is characterised in that the deflection control means are mechanically adjustable and are driven by an electro-mechanical drive in accordance with the rate of change of position of the craft and in that said electro-mechanical drive is operatively coupled to a range control switch of the display apparatus so that alteration of the scale of the display automatically varies the amount of adjustment of said deflection control means with respect to change of position of the craft so that the display may be stabilized on all the display scales without employing any additional deflection control means.

In ships, it is known to employ logs which produce electrical pulses representative of units of distance travelled; for example one well known form of log produces 400 pulses for each nautical mile, that is to say one pulse for every 15.2 feet of vehicle movement. It is often convenient therefore if the deflection control means can be adjusted in accordance with such pulses. Even if the craft should not have such a log which produces pulses, an electrical generator can readily be employed which is arranged to produce similar pulses at a rate which can be adjusted in accordance with the speed of the craft. In radar display apparatus for use with such a log or other device which produces an electrical pulse corresponding to each unit of distance travelled by the craft, the aforementioned electro-mechanical drive may comprise an electric motor which is started by each pulse and is automatically stopped, after making a predetermined number of revolutions, by means of a cam-operated or commutator switch driven by the motor through a reduction gear. In this apparatus the aforementioned range control switch may be operatively connected to bring into use alternative cam-operated or commutator switches so that the number of revolutions of the motor for each pulse can be varied by the selection of the appropriate cam or commutator. Separate cams or commutators may be mounted on a single shaft which is driven from the motor by the aforementioned reduction gear and/or they may be mounted on separate shafts driven through different reduction gears from the motor. For example, in one particular display apparatus having four range scales, it has been found convenient to employ two cams driven by a first reduction gear and another two cams driven by a second reduction gear.

In an alternative form of construction the aforementioned electro-mechanical drive may comprise an electric motor and the range control switch may be arranged to control the speed of the motor by switching impedances in a supply circuit to the motor so that the speed is inversely proportional to the scale of the display (scale being defined as the ratio between the actual range and the physical distance on the display screen so that the largest scale is that providing the maximum possible range) and said deflection control means in this arrangement are driven by said electric motor through a manually adjustable variable speed drive. The manually adjustable variable speed drive would be set according to the speed of movement of the craft and the display would thus be deflected at a speed dependent on this setting.

In radar display apparatus having fixed deflection coils for off-centering the plan position display, the aforementioned deflection control means driven by said electro-mechanical drive may comprise two potentiometers or variable resistors driven through a mechanical resolver which resolves the motion into sine and cosine components dependent on the direction of travel of the craft, the potentiometers or variable resistors being arranged to control the off-centering currents through the deflection coils. The direction of travel may be set into the resolver manually or the resolver may be coupled to a compass so that the resolver is automatically controlled to resolve the motion into two components according to the heading of the craft.

As indicated above, an electrical generator may be employed for generating pulses corresponding to the speed of the craft. For use on a ship, as an alternative to a log which produces 400 pulses per nautical mile, the generator must have quite a low recurrence frequency, of the order, for example, from ⅓ of a pulse per second to 4 pulses per second. For this purpose, there may be used a neon time-base generator having a neon tube of which the anode is connected through an adjustable resistor to the positive terminal of a direct voltage supply source and of which the cathode is connected through a resistor to the negative terminal of the supply source; a condenser also being connected between the anode and the negative terminal of the supply source. The pulse recurrence frequency of this neon time-base generator will depend on the magnitudes of the condenser and the variable resistor and can be adjusted by adjusting the variable resistor. This variable resistor may be calibrated to indicate the equivalent speed of the craft.

In the following description reference will be made to the accompanying drawings in which:

FIGURE 1 is a block diagram illustrating a pulse radar apparatus and display system for use on a ship;

FIGURE 2 is a block diagram illustrating a modified construction of part of the apparatus of FIGURE 1;

Figure 3:
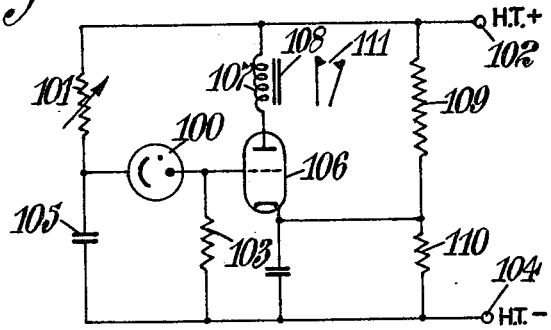
FIGURE 3 is a circuit diagram of a pulse generator for use in the apparatus of FIGURE 1.

Referring to FIGURE 1 there is shown a microwave pulse radar having a transmitter 10 generating short duration pulses of microwave energy in synchronism with control pulses produced by a trigger pulse generator 11. The output pulses from the transmitter 10 are fed through a duplexer 12 to a rotatable scanning aerial 13. The echoes of the transmitted pulses, after reception by the aerial 13, are fed through the duplexer 12 to a receiver 14 and, after detection, are applied as brightness modulation signals to a cathode ray tube 15. There is shown also in FIGURE 1 a time base generator 16 for producing radial deflection of the cathode ray tube beam and the particular arrangement as shown in FIGURE 1 makes use of a rotating coil deflection system, a sawtooth output from the generator 16 being fed to a rotatable coil assembly 17 which is driven by a motor 18 through gearing 19, the motor being controlled both by an aerial bearing transmitter 20 and by a compass 21 so that the deflection coil assembly 17 is rotated in accordance with the compass bearing of the aerial 13. The time base generator 16 is controlled by the trigger pulse generator 11 so that the time base deflections start at the time of the transmitted pulses and there is provided a range control switch 22 illustrated diagrammatically as having four positions for providing four different range scales. In the particular display system to be described, these range scales give displays in which the radius of the display screen correspond to 0.8, 2, 5 and 10 miles.

The radar apparatus thus far described is of conventional construction and is merely illustrative of a typical form of plan position radar apparatus. It will be readily apparent to those skilled in the art that other forms of plan position radar apparatus may equally well be employed with the display stabilising apparatus now to be described. For example, instead of having a rotatable deflection coil assembly, fixed deflection coils may be used which are separately fed with suitable deflection signals corresponding to the resolved components of the required deflection of the cathode ray beam.

The present invention provides means for stabilising the position of the display on the screen of the cathode ray tube so that echoes from fixed targets may remain in fixed positions on the display screen and for this apparatus there are provided two fixed deflector coils or two sets of deflector coils arranged for deflecting the cathode ray beam respectively in two directions at right angles and indicated diagrammatically at 30 and 31. The currents through these deflector coils are controlled by potentiometers 32, 33 respectively, which potentiometers might be used as variable resistors for controlling directly the currents through the deflection coils 30, 31 or, as shown, might control the outtput of current generators 34, 35 feeding the deflection coils. If the taps of the potentiometers 32, 33 were fixed, the currents through the coils 30, 31 would remain constant and would off-centre the display on the screen of the tube 15 by constant amounts in the two co-ordinate directions. The required stabilisation of the display is effected by adjusting the setting of these taps and, for this purpose, there is provided an electric motor 40 which is coupled by a shaft 41 to a 6 to 1 reduction gear 42 having an output shaft 43 carrying a switch-operating cam 44. This cam 44 is arranged to maintain a pair of micro-switch contacts 45 closed except for one short period during each revolution of the cam. The shaft 43 also drives a 2 to 1 reduction gear 46 having an output shaft 47 carrying a second switch-operating cam 48 which keeps a second pair of micro-switch contacts 49 closed except for a short period during each revolution of the cam 48. The shaft 47 also drives a 2.5 to 1 reduction gear 50 having an output shaft 51 carrying a switch-operating cam 52 which keeps a third pair of micro-switch contacts 53 closed except for a short period during each revolution of the cam 52. The shaft 51 drives a further 2.5 to 1 reduction gear 54 having an output shaft 55 carrying a fourth cam 56 which co-operates with a fourth pair of micro-switch contacts 57 to keep those contacts closed except for a short period during each rotation of the cam 56. The shaft 55 drives a resolver 60 which resolves the rotational movement of the shaft 55 into rotational components bearing to the rotation of the shaft 55 ratios corresponding to the sine and cosine of an angle which is set into the resolver by a compass repeater 62 which angle represents the heading of the ship with respect to the two co-ordinate directions defined by the directions of deflection of the coils 30, 31. The outputs from the resolver 60 indicated by the two chain dotted lines 63 and 64 respectively mechanically drive the taps of the aforementioned potentiometers 32, 33. These taps are thus driven so that their movements are proportional to the rotation of the motor 40 and have a ratio to one another corresponding to the sine and cosine of the angle set in the resolver 60 by the compass repeater 62.

As is explained later, the four pairs of micro-switch contents 45, 49, 53 and 57 correspond to the four range scales, the contacts 45 corresponding to the 10 mile scale, the contacts 49 to the 5 mile scale, the contacts 53 to the 2 mile scale and the contacts 57 to the 0.8 mile scale and it will be noted that the gear ratios in the mechanical drive system between the operating cams correspond to the ratios between the scales.

There is also shown diagrammatically in FIGURE 1 a ship's log 70 which is of the kind producing an electrical pulse for each unit of distance travelled by the ship. This log may be connected by means of a switch 71 to the operating coil 72 of a relay RLA. There is also provided a pulse generator 73, which will be described in further detail later, which may alternatively be connected by the switch 71 to the coil 72. The relay RLA controls two normally open contacts RLA1. When the contacts RLA1 are closed, a circuit is completed from a positive direct supply source at terminal 74 through the contacts RLA1 and an operating coil 75 of a second relay RLB to the negative terminal 76 of the supply source. The relay RLB controls a change-over contact RLB1 and a normally open contact RLB2. The contact RLB1 normally applies a short circuit across the input connections 77, 177 to the motor 40 but, when operated, connects the lead 77 to the movable contact arm 78 of a four-position switch which is mechanically ganged with the aforementioned range control switch 22. The switch arm 78 connects a selected one of four pairs of contacts 45, 49, 53 and 57 in a circuit from the positive supply terminal 74 which is completed, when relay RLB is operated, by the then closed contact RLB2 and by the operating coil 75 of relay RLB so forming a self-holding circuit for the relay RLB.

It will be seen that when a pulse is received either from the log 70 or from the pulse generator 73 according to the position of the switch 71, the coil 72 of relay RLA is momentarily energised and its contact RLA1 will complete the circuit for the operating coil of RLB. The contact RLB2 will complete a self-holding circuit for the relay RLB through the selected micro-switch contacts 45, 49, 53 and 57, according to the position of the selector switch arm 78, and thus the relay RLB will remain energised. The circuit to the motor is also completed as described above by the closing of contact RLB2 and the motor will drive the four cams 44, 48, 52 and 56 until the contacts of the selected cam-operated switch open. The opening of these contacts will break the self-holding circuit of the relay RLB so that the contact RLB1 will change back to the normal position thereby cutting off the supply to the motor and completing a short circuit across the motor terminals. The opening of the contacts RLB2 will prevent the relay RLB from being re-energised even if the selected cam-operated switch should reclose due to the cam continuing to rotate after the motor is switched off, for example due to the inertia of the rotating parts of the apparatus. The application of a short circuit by contact RLB1 across the motor 40 acts as a load on the motor in its free-running state so as to ensure that the motor stops quickly and thus to minimise any such over-running. As will be explained later, such over-running does not affect the operation of the apparatus provided that it is not sufficient to cause any of the cams to turn through a complete revolution after the motor is switched off.

It will be seen that each pulse applied to the operating coil 72 of the relay RLA causes the motor to turn a predetermined number of revolutions dependent upon the particular cam-operated switch which is selected by the selector switch arm 78. This rotation of the motor will apply, through the reduction gears 42, 46, 50, and 54, a corresponding rotation to the input shaft of the resolver 60 which will drive thus the taps of the potentiometers 32, 33 by amounts further reduced in the ratios respectively of the sine and cosine of the input angle set into the resolver 60 by the compass repeater 62. The gear ratios and the off-centering deflection circuits are so designed and arranged that the rotational movement of the motor due to each input pulse to the relay RLA causes a displacement of the display on the screen on the tube 15 by an amount corresponding to the distance travelled by the ship for each pulse from the ship's log 70. For a typical case where the distance travelled for each pulse is 15.2 feet, the individual steps of movement of the display on the screen will be so small as to be imperceptible. It will be seen that even if the motor 40 over runs, such overrun will not affect the accuracy of the displacement of the display as it does not accumulate, the amount of overrun being compensated by reduced movement after the next pulse applied to the relay RLA.

The periods in which the cam-operated switches 45, 49, 53 and 57 remain open are made quite short so that the inevitable small amount of overrun of the motor 40 will ensure that these switch contacts are closed again after the motor has been switched off. Thus, after each operation of the motor, the circuit is in a condition to receive the next applied pulse from the log 70 or the pulse generator 73.

It will be seen that, if the switch 71 is set to connect the log 70 to the relay RLA, the display on the screen of the cathode ray tube 15 is automatically displaced in accordance with the movement of the craft and that the operation is not affected by the switching of the range scale of the display by operation of the switch 22. Likewise, if the switch 71 is set to connect the pulse generator 73 to the relay RLA, the display is displaced in a direction determined by the compass repeater 62 and at a rate dependent on the frequency of pulses from the generator 73. This generator, as described later may be set to produce pulses at a desired recurrence rate to simulate the pulse from a log and hence can be set to correspond to any desired speed of the ship.

Instead of providing four separate reduction gears as shown in FIGURE 1, it may be preferred to use only two reduction gears 90, 91 as shown in FIGURE 2 which illustrates a modified form of drive from the motor 40 to the resolver 60 of FIGURE 1. The reduction gear 90 is driven from the shaft 41 of the motor 40 and the output shaft 92 of the gear 90 carries two cams 93, 94 of which cam 93 is a double lift cam operating the contacts 45 twice in each revolution of the shaft 92 and the cam 94 is a single lift cam for operating the contacts 49 once in each revolution of the shaft 92. The input of reduction gear 91 is driven by the shaft 92 and carries two cams 95, 96 of which cam 95 is a five lift cam for operating the contacts 53 five times in each revolution of the cam 95 whilst the cam 96 is a double lift cam for operating the contacts 57 twice in each revolution of the cam 96. The reduction gear 91 also drives the resolver 60 which in turn drives the potentiometer 32, 33 as in the arrangement of FIGURE 1. For convenience in the arrangement of FIGURE 2, both the reduction gears 90 and 91 are 12.5 to 1 reduction gears to make for standardisation of the components. It will be understood that the reduction ratio of the gear 90 of FIGURE 2 and of the gear 42 of FIGURE 1 depends only on the speed of the motor 41 and by suitable choice of the rotational speed of the motor and of the component values in the off-centering deflection circuits, any desired reduction ratio may be employed in gears 42 and 90.

FIGURE 3 illustrates a simple form of pulse generator circuit which may be used as the pulse generator of FIGURE 1. The circuit of FIGURE 3 is a neon time base generator having a neon tube 100 of which the anode is connected through a variable resistor 101 to a positive terminal 102 of a direct voltage supply source and of which the cathode is connected through a resistor 103 to the negative terminal 104 of the supply source. A capacitor 105 is also connected between the anode of the neon tube 100 and the negative terminal 104 of the supply source. The cathode of the neon tube 100 is connected also to the grid of a grid-controlled electronic valve 106 of which the anode is connected to the terminal 102 through the operating coil 107 of a relay 108 and the cathode is connected to a tap on a potentiometer 109, 110 connected between the supply terminals 102, 104. It will be seen that the capacitor 105 charges through the variable resistor 101 and, when the anode of the tube 100 reaches a sufficiently high potential that the tube conducts, the capacitor 105 discharges rapidly through the neon tube and the resistor 103 thereby applying a short duration positive-going pulse to the grid of the valve 106. This valve is normally biased beyond cut-off by the cathode being connected to the tap on the potentiometer 109, 110 but the applied positive going pulse on the grid makes the valve conduct thereby operating the relay 108 for a short period to close its contact 111. These contacts 109 may be connected in a circuit with a source of supply of direct current to provide the necessary pulses to operate the aforementioned relay RLA. It will be seen that the recurrence frequency of the output of the generator of FIGURE 3 depends on the time constant of the charging circuit for the capacitor 105 and hence may be adjusted by means of the variable resistor 101. The circuit is arranged to produce pulses of repetition rates corresponding to those of the ship's log 70 over the required range of speeds and the variable resistor 101 may be calibrated to show the corresponding speed.

Figure 4:
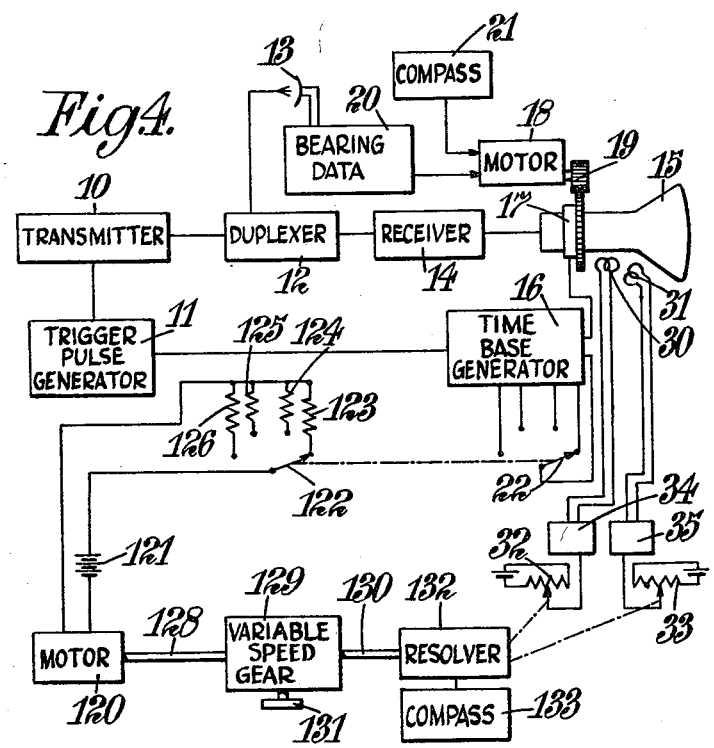
FIGURE 4 is a block diagram of another pulse radar apparatus and display system.

An alternative arrangement of radar apparatus and display system is illustrated in FIGURE 4 in which, as in FIGURE 1, there is provided a microwave pulse transmitter 10 controlled by a trigger pulse generator 11. The radio frequency pulses from the transmitter 10 are fed through a duplexer 12 to a rotatable scanning aerial 13 and echoes from the transmitted pulses, after being received by the aerial 13, pass through the duplexer 12 to the receiver 14 and are applied, after detection, to the cathode ray tube 15 as a brightness modulation. As in the arrangement of FIGURE 1 there is provided a time base generator 16 having a range control switch 22 which time base generator feeds a rotatable deflection coil assembly 17 driven by a motor 18 through gearing 19, the motor being controlled both by aerial bearing data from a bearing data transmitter 20 and a compass 21 so as to provide an azimuth stabilised display on the screen of the tube 15. There are also provided fixed deflection off-centering deflection coils 30, 31 the currents through which are controlled by means of potentiometers 32, 33 which potentiometers may either be used as variable resistors for direct control of currents through the coils 30, 31 or used indirectly to control the current generators 34, 35 feeding the coils 30, 31.

For driving the taps of the potentiometer 32, 33 there is provided a motor 120 which is energised from a supply source indicated diagrammatically from a battery 121. A four position switch having a movable switch arm 122 is provided for connecting any one of four impedances 123 to 126 in series in the supply circuit to the motor 120 and this switch is mechanically coupled to the aforementioned range control switch 22. The shaft 128 of the motor drives a variable speed gear 129 having an output shaft 130, the speed of which can be controlled by a manual control knob 131 on the variable speed gear.

The shaft 130 drives the resolver 132 so as to provide two output rotations having ratios to the input corresponding to the sine and cosine of an input setting applied to the resolver from a compass repeater 133 and these mechanical outputs from the resolver 132 are used to drive the taps of the two potentiometers 32, 33.

As stated above, the switch arm 122 is mechanically ganged with the switch arm of the range control switch 22. The resistors 123 to 126 are so proportioned that the speeds of the motor 120 in the four positions of the switch arm 122 are inversely proportional to the corresponding scales of the display on the cathode ray tube 15 determined by the setting of the switch 22. The manual control knob 131 for the variable speed gear 129 is set in accordance with the speed of movement of the craft and there may be provided a suitable calibrated scale associated with the control knob 131. It will be seen that the input to the resolver 132 is thus a rotation dependent on the scale of the display as set by the switch 22 and also dependent on the speed of the craft as set by the manual control knob 131. The gear ratios are arranged so that the display is deflected on the screen of the tube 15 at a rate corresponding to the speed of movement of the craft. It will be seen that the arrangement of FIGURE 4 provides a simple means for effecting the necessary displacement of the display on the screen of the tube for use where there is no log or other device for automatically producing signals corresponding to the movement of the craft.

I claim:
1. In radar display apparatus for use on a mobile craft and having a plan position display on a display screen with a range control switch operative to change the scale of the display; controllable deflection means for effecting displacement of the display on the screen, mechanically-adjustable control means for said deflection means, an electro-mechanical drive arranged to drive said mechanically-adjustable control means in accordance with the rate of change of position of the craft, which electro-mechanical drive is adjustable to alter the relationship between displacement of the display and change of position of the craft, and means coupling said range control switch to said electro-mechanical drive to alter the amount of adjustment of said deflection control means with respect to change of position of the craft in accordance with the scale of the display whereby the display is stabilized on all the display scales.

2. In radar display apparatus for use on a mobile craft having a log to produce an electrical pulse corresponding to each unit of distance travelled by the craft; a plan position display on a display screen with a range control switch operative to change the scale of the display, controllable deflection means for effecting displacement of the display on the screen, mechanically-adjustable control means for said deflection means, an electric motor having an output shaft driving said control means, circuit means coupled to said log to be responsive to said electrical pulses and arranged to start said electric motor on each pulse, switch means driven by said motor output shaft arranged to stop the motor after the motor output shaft has made a selected pre-determined number of revolutions, and means coupling said range control switch to said switch means to vary the number of revolutions of the output shaft before the motor stops in accordance with the scale of the display whereby the amount of adjustment of the deflection control means with respect to change of position of the craft is made to correspond to the range scale selected by the setting of the range control switch.

3. In radar display apparatus for use on a mobile craft; a plan position display on a display screen with a range control switch operative to change the scale of the display, controllable deflection means for effecting displacement of the display on the screen, mechanically-adjustable control means for controlling said deflection means, an electrical pulse generator for producing pulses at an adjustable rate, an electric motor having an output shaft driving said control means, circuit means coupled to said pulse generator to be responsive to said electrical pulses and arranged to start said electric motor on each pulse, switch means driven by said motor output shaft arranged to stop the motor after the motor output shaft has made a selected pre-determined number of revolutions, and means coupling said range control switch to said switch means to vary the number of revolutions of the output shaft before the motor stops in accordance with the scale of the display whereby the amount of adjustment of the deflection control means with respect to change of position of the craft is made to correspond to the range scale selected by the setting of the range control switch.

4. In radar display apparatus for use on a mobile craft; a plan position display on a display screen with a range control switch operative to change the scale of the display, controllable deflection means for effecting displacement of the display on the screen, mechanically-adjustable control means for said deflection means, means producing electrical pulses at a rate corresponding to the speed of travel of the craft, an electric motor having an output shaft driving said control means, circuit means coupled to said pulse producing means to be responsive to said electrical pulses and arranged to start said electric motor on each pulse, switch means driven by said motor output shaft arranged to stop the motor after the motor output shaft has made a selected pre-determined number of revolutions, and means coupling said range control switch to said switch means to vary the number of revolutions of the output shaft before the motor stops in accordance with the scale of the display whereby the amount of adjustment of the deflection control means with respect to change of position of the craft is made to correspond to the range scale selected by the setting of the range control switch.

5. Radar display apparatus as claimed in claim 4 wherein said switch means comprises a plurality of cam-operated switches driven by said output shaft and operative to stop the motor after different numbers of revolutions of said output shaft and wherein said means coupling said range control switch to said switch means are operative to selectively connect one of said cam-operated switches into effective operation to control the stopping of the motor.

6. Radar display apparatus as claimed in claim 4 wherein said switch means comprise a plurality of commutator switches driven by said output shaft and operative to stop the motor after different numbers of revolutions of said output shaft and wherein said means coupling said range control switch to said switch means are operative to selectively connect one of said commutator switches into effective operation to control the stopping of the motor.

7. Radar display apparatus as claimed in claim 4 wherein said switch means include at least two cam-operated switches driven by cams on a single cam-shaft and a reduction gear driving said cam-shaft from said output shaft and wherein said means coupling said range control switch to said switch means are operative to selectively connect one of said cam-operated switches into effective operation to control the stopping of the motor.

8. Radar display apparatus as claimed in claim 4 wherein said switch means include at least two cam-operated switches driven by cams on separate cam-shafts and reduction gears driving said separate cam-shafts from said output shaft at different speeds and wherein said means coupling said range control switch to said switch means are operative to selectively connect one of said cam-operated switches into effective operation to control the stopping of the motor.

9. In radar display apparatus for use on a mobile craft and having a plan position display on a display screen with a range control switch operative to change the scale of the display; deflection means for effecting displacement of the display on the screen which deflection means have a mechanical drive for altering the displacement of the display, an electric motor energized from a supply circuit, a variable speed gear having an input shaft coupled to said electric motor and an output shaft coupled to said mechanical drive, alternative impedances in said supply circuit, a speed control switch for switching said alternative impedances to vary the speed of said motor, and means coupling said range control switch to said speed control switch to stabilize the display on the different display scales by altering the rate of adjustment of said deflection control means in accordance with the scale of the display.

10. In radar display apparatus for use on a mobile craft and having a plan position display on the screen of a cathode ray tube with a range control switch operative to change the scale of the display; the combination of fixed orthogonal deflection coils for effecting displacement of the display on the screen of the tube in two orthogonal directions, current supply circuits for feeding currents respectively to said orthogonal deflection coils, adjustable resistive impedances associated respectively with said current supply circuits for varying the currents fed to said coils, each of said adjustable resistive impedances having a mechanically movable control member, a mechanical resolver for resolving a mechanical input motion into sine and cosine output motions representative of components of the input motion in directions dependent on the setting of a control shaft, an electro-mechanical drive system for driving said resolver input at a rate dependent on the speed of travel of the craft, means coupling said resolver to said mechanically movable control members to drive the latter in accordance with said sine and cosine outputs, means for adjusting said electro-mechanical drive to vary the relationship between the input to the resolver and the distance travelled by the craft, and means coupling said range control switch to said means for adjusting said electro-mechanical drive in accordance with alteration of the scale of the display and thereby to effect a corresponding adjustment of the relationship between the displacement of the display and travel of the craft.

11. Radar display apparatus as claimed in claim 10 and having a compass connected to said resolver control shaft so that the resolver is automatically controlled to resolve the motion into two components according to the heading of the craft.

References Cited in the file of this patent

UNITED STATES PATENTS

| | | |
|---|---|---|
| 2,589,584 | Thompson | Mar. 18, 1952 |
| 2,701,352 | Kingdon | Feb. 1, 1955 |